United States Patent [19]
Ward

[11] 3,873,522
[45] Mar. 25, 1975

[54] METHOD FOR PRODUCING FREE FLOWING EPICILLIN

[75] Inventor: Michael Dudley Ward, Bromborough, England

[73] Assignee: E. R. Squibb & Sons, Inc., Princeton, N.J.

[22] Filed: Oct. 10, 1972

[21] Appl. No.: 296,391

[30] Foreign Application Priority Data
Nov. 22, 1971 United Kingdom............. 54162/71

[52] U.S. Cl............................. 260/239.1, 424/271
[51] Int. Cl........................................... C07d 99/16
[58] Field of Search................................. 260/239.1

[56] References Cited
UNITED STATES PATENTS

| 3,221,008 | 11/1965 | Wolf et al. | 260/239.1 |
| 3,467,654 | 9/1969 | McCormick | 260/243 C |
| 3,485,819 | 12/1969 | Weisenborn et al. | 260/239.1 |

Primary Examiner—Nicholas S. Rizzo
Attorney, Agent, or Firm—Lawrence S. Levinson; Merle J. Smith

[57] ABSTRACT

The flow characteristics of epicillin are improved by treating the crystalline needle form with a cationic surface active agent to obtain crystals with much better flow properties.

9 Claims, No Drawings

METHOD FOR PRODUCING FREE FLOWING EPICILLIN

SUMMARY OF THE INVENTION

Epicillin [α-amino-(1,4-cyclohexadienyl)methylpenicillin] is a semisynthetic penicillin derivative which normally crystallizes in the form of fine needles. The crystalline needles do not flow readily. In the preparation of solid dosage forms, particularly capsules and tablets, this creates problems in mixing and/or compressing, especially when machine operations are utilized.

It has been found that when the crystalline needle form of epicillin is recrystallized in the presence of a cationic surfactant, platelet-shaped or spherically-shaped crystals are formed. These crystals have free flowing characteristics and readily compress into tablets.

DETAILED DESCRIPTION OF THE INVENTION

The needle-shaped crystals which form when the antibacterial agent epicillin, a semi-synthetic penicillin derivative, is precipitated from acid solution with a base like sodium hydroxide, e.g., by the method described in U.S. Pat. No 3,485,819, have poor flow characteristics. The crystals tend to interlock with large air space between. This creates problems in the preparation of solid dosage forms such as capsules and tablets and whenever the substance is machine handled. Slugging is required to achieve the necessary density for filling capsules.

It has now been found that by precipitating epicillin from a solution containing about 0.10 to 1.0 percent (weight/vol.) of a cationic surface active agent crystals are obtained which have a more platelet or spherical shape and have free flowing characteristics under gravity pull. Other surface active agents do not produce these results. For example, an anionic surface active agent such as sodium lauryl sulfate is incompatible. Tween 20, which is anionic, has no effect.

The cationic surface active agents are quaternary ammmonium salts including mixed alkyl and alkylaralkyl quaternary ammonium halides, e.g., tetradecyltrimethylammonium bromide, benzalkonium chloride, quaternary salts of heterocyclic amines, e.g., cetyl pyridinum chloride and the like. Preferred are cetyl pyridinum chloride, benzalkonium chloride and tetradecyltrimethylammonium bromide, with cetyl pyridinium chloride giving the best results.

According to this invention the epicillin is precipitated from an aqueous acid solution containing the epicillin and about 0.10 to 1.0 percent (weight/vol.) of cationic surface acitve agent by the addition of a base.

According to the preferred modification, the epicillin is dissolved or dispersed in an aqueous acid solution which is at a temperature within the range of about 0° to 5°C. This solution is maintained at a low pH, e.g., below about 2 and preferably at about pH 1.5, until it is desired to precipitate the new crystalline form. A strong mineral acid, preferably sulfuric acid, is used to maintain the acid solution. The cationic surface active agent is then dissolved in the acid solution containing the antibiotic. Preferably the cationic surface active agent is added as a solution in water at about the same temperature as the epicillin solution. The cationic surface active agent is added in an amount to give a concentration of about 0.1 to 1.0 percent (weight/vol.), preferably about 1 percent, in the aqueous acid solution containing the epicillin.

Base is added to this solution to precipitate the epicillin. A strong base, preferably an alkali metal hydroxide like sodium hydroxide, is used for the precipitation. An aqueous solution about 5N is preferred. Precipitation occurs at about pH 2.8 to 3.0 but alkali is added until a pH of about 4 is reached to ensure complete precipitation.

The alkali solution which is added to precipitate the epicillin is preferably cooled to the temperature of the epicillin-surface active agent-containing solution. It has been found that best results are obtained when the precipitation is effected with both solutions at a temperature of about 15° to 20°C. It may be desirable, however, to maintain the temperature of the epicillin-containing solution below that, e.g., at about 5°C., while it is being prepared prior to the precipitation with the base.

The new crystalline form precipitates with the addition of the base and when complete, the crystals are separated by filtration, washed and dried. Additional amounts of the product may be obtained from the mother liquor. The crystals formed by this procedure do not have the needle-like shape, but have a more spherical or cubical shape. The epicillin flows freely and may be readily compressed into tablets by direct compression in tablet-making machines. The product also flows readily and has the required density so that it may be employed in capsule filling machinery. the free-flowing, surfactant treated epicillin has the same biological activity as the needle-shaped crystalline form.

The following examples are illustrative of the invention.

EXAMPLE 1

100 g. of non-free flowing epicillin in the form of needle-like crystals are dispersed in 400 ml. of cold distilled water. The temperature of the dispersion is maintained at below 5°C., using an ice bath. 79 ml. of 5.5 N sulfuric acid, cooled to 5°C., are added at the rate of 3 ml./minute to give a clear solution with a pH of 1.5.

A solution of 4 g. of cetyl pyridinium chloride in 100 ml. of distilled water is added to the sulfate solution. The solution is allowed to warm up to 20°C. 5 N sodium hydroxide solution is added with vigorous and continuous stirring at the rate of 7 ml./minute. Precipitation commences at pH 2.3 and further alkali is added (total 84 ml., 5.12 N) to ensure complete precipitation. The final pH is 4.0.

The precipitate is filtered using a No. 3 sintered glass filter. The free flowing material is washed with 3 × 100 ml. lots of distilled water followed by 3 × 100 ml. lots of acetone. The wet cake is dried for 12 hours at room temperature under 710 mm. vacuum. The dried material is passed through a 30 mesh screen to break up agglomerates. The epicillin is in the form of spherical crystals which flow freely.

EXAMPLE 2

100 g. of needle-form epicillin are dispersed with mechanical stirring in 400 ml. of cold distilled water (<5°C.) in an ice bath. 90 ml. of cold 5N sulfuric acid are run in at about 1 ml./minute with continuous stirring, keeping the temperature below 5°C. The epicillin goes into solution and the pH is 1.5.

4 g. of cetyl pyridinium chloride are dissolved in 80 ml. of distilled water with warming and made up to 100 ml. The solution is cooled to less than 5°C. and added to the acid solution. Cold 5N sodium hydroxide solution (5°C.) is added at 7 ml./minute until a pH of 4.0 is reached (83.5 ml. required). Precipitation occurs and stirring is continued for 5 minutes to ensure complete precipitation.

The crystals are filtered off through a No. 3 fritted glass funnel and then washed portionwise with about 250 ml. of cold distilled water. The crystals are sucked nearly dry, then washed portionwise with 270 ml. of cold acetone (5°C). The crystals are sucked as nearly dry as possible, then spread on petri dishes in thin layers. These are dried in a vacuum oven at 35°C. under 750 mm Hg. The dried material is passed through a 60 mesh screen to break down agglomerates. The yield of dried material is 84 g. The epicillin obtained thus is finer than the original material, has a more spherical crystalline appearance and flows freely in contrast to the original material which compacts.

The treated epicillin is admixed with 3 percent alginic acid and compressed on a single punch tablet machine using 9/32 inches concave punches. The tablets have a hardness of 5 Strong-Cobb units and a disintegration time of 2 minutes.

EXAMPLE 3

The procedure of Example 2 is followed substituting a 1 percent solution of benzalkonium chloride for the cetyl pyridinium chloride. Epicillin in the form of platelet-shaped crystals with free flowing characteristics is obtained.

EXAMPLE 4

The procedure of Example 2 is followed substituting a 0.5 percent solution of tetradecyltrimethylammonium bromide. The crystalline epicillin obtained has improved free-flowing characteristics over the untreated starting material.

What is claimed is:

1. A method for producing free flowing epicillin which comprises precipitating epicillin from aqueous strong mineral acid solution at a pH below about 2 containing about 0.10 to 1.0 percent of cationic surface active agent by the addition of alkali at a temperature of about 15° to 20° C. and isolating said free flowing epicillin.

2. A method as in claim 1 wherein the cationic surface active agent is cetyl pyridinium chloride.

3. A method which comprises dissolving epicillin in the form of needle-like crystals in aqueous strong mineral acid solution at a pH of about 1.5, adding thereto a cationic surface active agent selected from the group consisting of cetyl pyridinium chloride, benzalkonium chloride and tetradecyltrimethylammonium bromide in a concentration of about 0.10 to 1.0 percent (weight-/vol.) and at a temperature in the range of about 15° to 20°C., adding alkali metal hydroxide to the solution to increase the pH within the range of about 2 to 5 thereby precipitating epicillin and separating free flowing crystalline epicillin therefrom.

4. A method as in claim 3 wherein the cationic surface active agent is cetyl pyridinium chloride.

5. A method as in claim 3 wherein the cationic surface active agent is cetyl pyridinium chloride and the alkali is sodium hydroxide solution.

6. A method as in claim 5 wherein the mineral acid is sulfuric acid.

7. A method as in claim 1 wherein the cationic surface active agent is a mixed alkyl or mixed alkyl-aralkyl quaternary ammonium halide.

8. A method as in claim 1 wherein the cationic surface active agent is a quaternary salt of heterocyclic amine.

9. A method as in claim 1 wherein the cationic surface active agent is cetyl pryidinium chloride, benzalkonium chloride or tetradecyl-trimethylammonium bromide.

* * * * *